United States Patent [19]
Mokdad

[11] Patent Number: 5,755,143
[45] Date of Patent: May 26, 1998

[54] DOUBLE DAMPER FLYWHEEL

[75] Inventor: Ayman Mokdad, Saint-Ouen, France

[73] Assignee: Valeo, Paris, France

[21] Appl. No.: 640,752

[22] PCT Filed: Sep. 5, 1995

[86] PCT No.: PCT/FR95/01156

§ 371 Date: May 6, 1996

§ 102(e) Date: May 6, 1996

[87] PCT Pub. No.: WO96/07838

PCT Pub. Date: Mar. 14, 1996

[30] Foreign Application Priority Data

Sep. 6, 1994 [FR] France ................................ 94 10652

[51] Int. Cl.⁶ ........................... F16F 15/10; G06G 1/00
[52] U.S. Cl. ................................ 74/574; 74/572; 464/68
[58] Field of Search ................... 74/572, 574, 573 R; 464/68; 192/106.2

[56] References Cited

U.S. PATENT DOCUMENTS

| | | | |
|---|---|---|---|
| 4,462,269 | 7/1984 | Inglis | 74/572 |
| 5,111,714 | 5/1992 | Honoki et al. | 192/106.2 |
| 5,123,877 | 6/1992 | Maucher et al. | 464/68 |
| 5,323,665 | 6/1994 | Redikar | 74/572 |
| 5,579,665 | 12/1996 | Mott et al. | 74/574 |

FOREIGN PATENT DOCUMENTS

| | | |
|---|---|---|
| 042983 | 5/1991 | European Pat. Off. |
| 464997 | 1/1992 | European Pat. Off. |
| 2565650 | 6/1985 | France . |
| 2658880 | 8/1991 | France . |
| 2695579 | 3/1994 | France . |
| 2255395 | 11/1992 | United Kingdom . |
| 94 07058 | 3/1994 | WIPO . |
| 94 27062 | 11/1994 | WIPO . |

*Primary Examiner*—Vinh T. Luong
*Attorney, Agent, or Firm*—Longacre & White

[57] ABSTRACT

A double damper flywheel having a rotating mass including a plurality of annular parts, a first part carrying a hub having a bearing for the rotation of a second mass and another annular part having an annular plate provided with an axially oriented external cylindrical skirt. The plate includes a first group of radial lugs for fixing to the first annular part and a second group of radial lugs for mounting springs acting between the two masses. The second group of lugs are offset axially and circumferentially with respect to the first group of lugs.

10 Claims, 2 Drawing Sheets

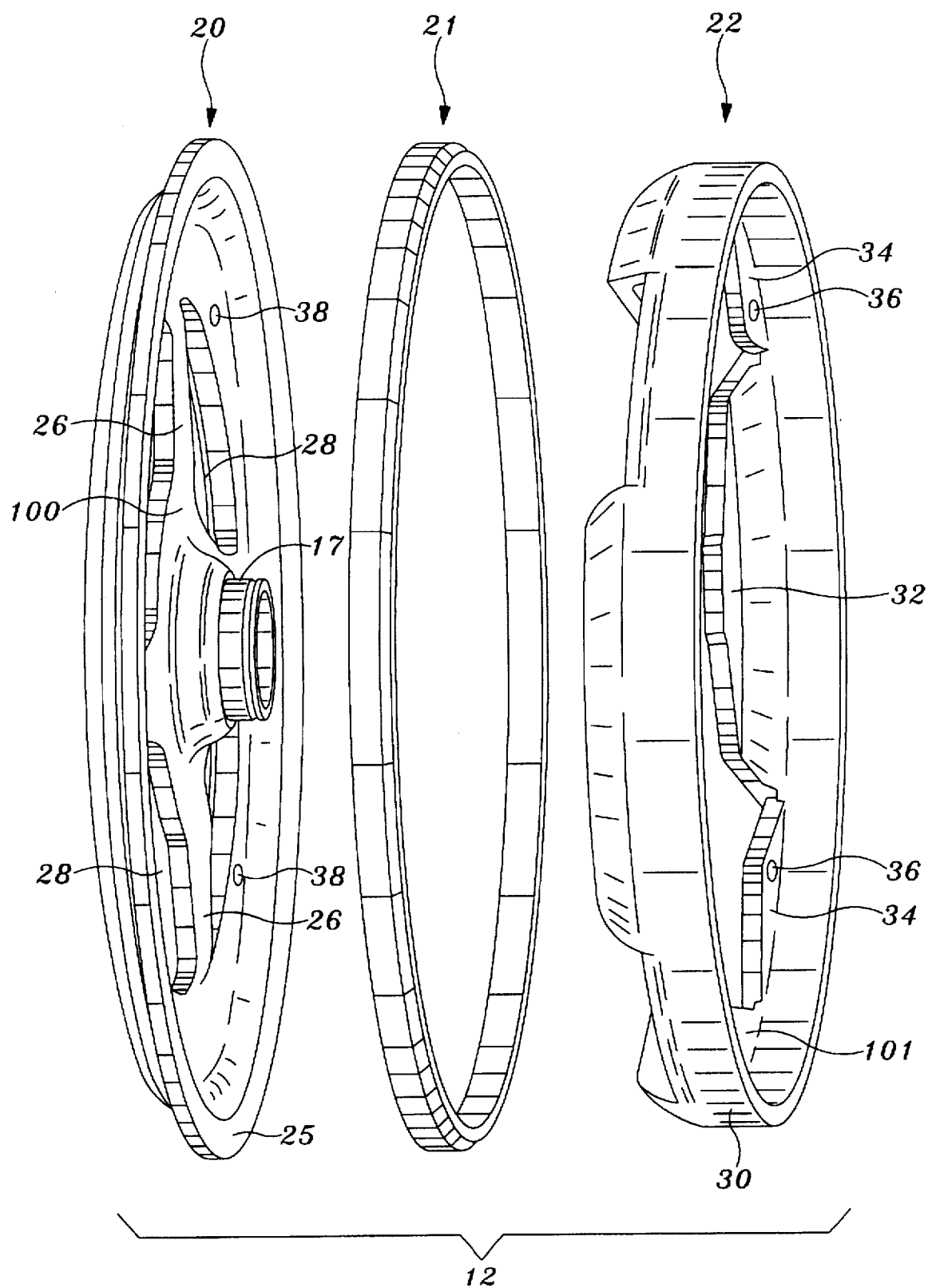

5,755,143

DOUBLE DAMPER FLYWHEEL

BACKGROUND OF THE INVENTION

1. Field of the Invention

The present invention relates to a damped flywheel, and more particularly to a double damped flywheel of the kind comprising two coaxial masses which are mounted for movement of one with respect to the other against the action of resilient means.

2. Description of the Prior Art

Such a damped flywheel, especially for motor vehicles, is described for example in the document FR-A-2 565 650. One of the masses, referred to as a "first mass", is adapted to be fixed to a driving shaft, while the other mass, referred to as a "second mass", includes a reaction plate for a friction clutch. Generally, the masses in question are made of moulded material, and are typically castings. This moulding is relatively difficult to carry out, because of the complexity of the arrangement. In addition, the castings do not withstand centrifugal forces well under extreme operating conditions.

For this reason, the documents FR-A-2 695 579 and EP-A-0 427 983 provide for the first mass to consist of a plurality of annular components, at least some of which are made of press-formed metal plate, and which are fixed coaxially to each other.

One of these members, referred to as first member, includes a central portion which is fixed to a hub and which carries a bearing for rotation of the other mass, which constitutes a reaction plate for a friction clutch.

A further one of the said members defines a spacing crown portion between the first member made from metal plate and a second member made from metal plate.

As a result, full advantage is not taken of these two members made from metal plate.

In addition, as can be best seen in FIG. 1 of the document EP-A-0 427 983, this crown member increases the radial size of the damped flywheel.

This can be detrimental in the case in which the damped flywheel is mounted within a casing having inclined walls which extend close to the outer periphery of the second mass. It is therefore desirable in some cases to reduce its radial size.

SUMMARY OF THE INVENTION

The invention is most particularly concerned with an improvement in the said first mass which enables the latter to be made in a simpler and less expensive way, in a material which is better able to resist the effects of centrifugal force, and without unduly increasing the radial size of the damped flywheel in the region of the outer periphery of the second mass.

More precisely, the invention provides a damped flywheel, especially for a motor vehicle, of the kind comprising two coaxial masses mounted for movement of one with respect to the other against the action of resilient damping means, in which one of the masses, referred to as a first mass is adapted to be fixed to a driving shaft and consists of a plurality of annular members, at least some of which are press-formed from metal plate, and which are fixed to each other coaxially, and in which one of the above mentioned said annular members, referred to as the first annular member, is press-formed from metal plate and comprises a central portion, orientated generally transversely and fixed to a hub which carries a bearing for rotation of the other mass, referred to as the second mass, which constitutes the reaction plate of a friction clutch, characterised in that another one of the above mentioned said annular members, referred to as a third annular member, is press-formed from metal plate and comprises an annular radial plate having at its outer periphery a cylindrical skirt portion which extends axially and at least partly surrounds the second mass, and in that the said radial plate includes a first group of radial lugs by means of which it is fixed to the said first annular member, together with a second group of radial lugs which are configured for mounting the resilient damping means, the lugs of this second group being offset axially with respect to those in the first group, so that the external skirt portion encloses the resilient damping means.

Thanks to the invention it is possible to increase the inertia, while having high resistance to centrifugal force and with components of simple form.

In this connection, the members provided in accordance with the invention are more dense than castings, and the outer skirt of the third member extends radially outwardly of the second mass, which it surrounds at least partially.

It will be appreciated that this skirt has a thickness which is less than the spacing crowns of the prior art, so that the overall radial size of the damped flywheel at this point is reduced.

The simple form of the said third member, which enables the resilient damping means to be easily mounted by its second group of radial lugs, will be appreciated.

Although it would of course have been possible to give the first member an external skirt portion in the same way as the third member, and to fasten together the skirt portions of the first and third members, in that case the overall radial size would be increased, because the skirt portion of the first member would be fitted over the outer periphery of the skirt portion of the third member.

In addition, this would lead to very deep drawing of the first member, to the detriment of ease of manufacture.

Thus, because of the first group of lugs of the third member, the first member is simplified, while the overall radial size of the damped flywheel is reduced, and it is possible to fit the resilient damping means over a large circumference.

In a first embodiment, the second group of radial lugs carries means for articulating the above mentioned resilient damping means.

Thus, the radial lugs of the said second group are, in one embodiment, provided with holes in alignment with holes in the first annular member, with axially oriented spindles being mounted in the said holes.

The said resilient damping means may consist of cassettes enclosing at least one spring, in the manner described for example in the document WO-A-94/27062, with each cassette including a bearing engaged on the spindle.

Thanks to the invention, it is possible to configure the first annular member in such a way that the damped flywheel is thicker at its outer periphery than at its inner periphery.

The said first member may have a serpentine form at its outer periphery, which enables a starter crown to be easily fastened so as to be driven by the starter of a motor vehicle, together with a second member which enables inertia to be increased further.

Thus the available space is occupied to the full, and this is achieved with simple components.

BRIEF DESCRIPTION OF THE DRAWINGS

The invention will be better understood, and more of its advantages will appear more clearly, in the light of the following description of one possible embodiment of a damped flywheel in accordance with the principle of the invention, given by way of example only and with reference to the attached drawings, in which:

FIG. 3 is a perspective view of the various annular members that constitute the said first mass, before they are fastened together.

DETAILED DESCRIPTION OF THE PREFERRED EMBODIMENT

Figure 1:
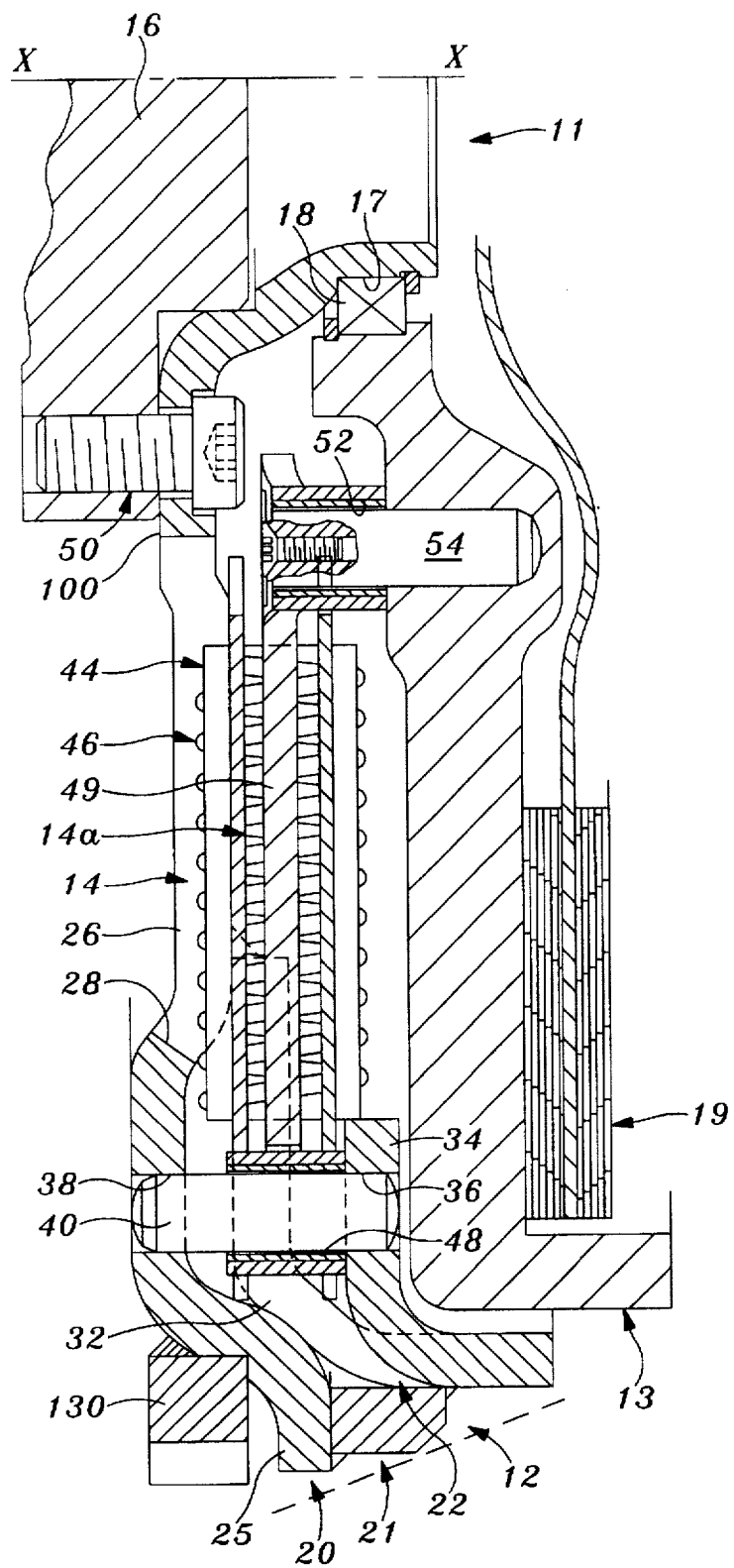
FIG. 1 is an axial half section of a double damped flywheel in accordance with the invention.

The drawings show an arrangement constituting a double damped flywheel 11, comprising two coaxial parts which are mounted for movement of one with respect to the other against the action of resilient damping means 14. This arrangement is part of a damped flywheel for a motor vehicle. The two parts constitute coaxial masses which rotate about an axis of symmetry x—x which is also the common axis of rotation of a driving shaft 16 which in this example is the crankshaft of an internal combustion engine, a friction clutch part of which is shown, and an input shaft of a gearbox not shown. A first rotatable mass 12 is connected to the driving shaft 16, in this example by means of studs 15 located close to its inner periphery, while a second rotatable mass 13 is coupled through an interposed clutch mechanism and friction wheel 19 to the input shaft of the gearbox.

The second mass is mounted on a tubular hub 17 of the first mass 12, for rotation with it, through an interposed rotation bearing which in this example consists of a ball bearing 18. The second mass 13 constitutes, in the conventional way, the reaction plate of the friction clutch mentioned above. The friction wheel 19 of this clutch, in engagement with the mass 13 which constitutes the reaction plate, can be seen in FIG. 1.

The second mass 13 is thus coupled disengageably to, and for rotation with, a driven shaft, such as the input shaft of the gearbox in the case where the invention is applied to a motor vehicle, via the friction wheel 19 which has, in the usual way, at its inner periphery, a hub which is splined internally for coupling it in rotation to the said driven shaft.

It will be recalled that the clutch mechanism includes a cover plate fixed on the reaction plate 13, a diaphragm, and an axially movable pressure plate. The diaphragm urges the pressure plate towards the position in which the friction liners of the clutch wheel 19 are gripped between the said pressure and reaction plates.

Thus the clutch is normally engaged, and motion is transmitted from the driving shaft to the driven shaft via the clutch wheel 19. In order to disengage the clutch, a force is exerted on the ends of the fingers of the diaphragm with the aid of a clutch release bearing (not shown). This force is exerted in a pulling or pushing mode as the case may be, and enables the force exerted by the diaphragm on the pressure plate to cease, so that the friction liners of the clutch wheel 19 are released.

In accordance with a significant feature of the invention, the said first mass 12 consists of a plurality of annular members 20, 21, 22 (three in the example shown), which are secured coaxially to each other. The annular members are in this example welded together, which leaves more space free for accommodation of the resilient means 14. The members 20 and 22 are in this example press-formed from metal plate, and the member 21 is here in the form of a rolled and welded steel ring in order to increase inertia. It could also be press-formed from metal plate.

As can be seen in FIG. 3, a first annular member 20, press-formed from metal plate, comprises a peripheral crown portion 25 which is joined through four radial arms 26 to a generally transversely orientated central portion 100, of which, in this example, the above mentioned hub 17 is an integral part. This hub is machined so that it can carry the ball bearing 18 which constitutes the bearing for rotation of the second mass 13. As will be seen later herein, the wide cutouts 28 defined between the four arms permit the accommodation of cassettes which are part of the above mentioned resilient means 14, in a space which is as small as possible in the axial direction. Good ventilation is also obtained, which enables the second mass 13 to be well cooled. A toothed crown, i.e. a starter crown 130, which is arranged to be driven by a starter, is also welded to the outer periphery of the said first annular member 20 on the crown portion 25 of the latter, which accordingly has a sinuous profile so as to have at its outer periphery a generally transversely orientated flange extending away from the axis X—X. This flange is offset axially towards the second mass 13, with respect to the main portion of the first member 20, which accordingly has the general form of a shallow dish, with a hole through its base portion and carrying the hub 17 centrally.

A second annular member 21 consists of a simple ring (without any radial arms), which constitutes an axial spacer and which is fixed to the periphery of the first annular member 20 on the other side from the starter crown 130.

More precisely, this member 21 is fixed to the flange of the crown portion 25, with the starter crown 130 and the said second member 21 being disposed on either side of the said flange (FIG. 1). This second annular member is welded to the first member by a peripheral band of weld metal.

More precisely, the said second member is welded to the flange of the crown portion 25 and also, possibly, to a third member. It will be seen that the said second member 21 is chamfered, so that it will not interfere with the clutch casing within which the damped flywheel is mounted.

FIG. 1 shows, in a broken line, the location of part of this casing.

Finally in accordance with the invention, the said first mass includes a third annular member 22 which is provided with two groups of radial lugs. This third annular member consists of an annular radial plate 101 which is press-formed from metal plate, and which is provided at its outer periphery with an external cylindrical skirt portion 30 extending axially. This skirt portion 30, in this example, partly surrounds the second mass 13 as can be best seen in FIG. 1. The skirt portion is then spaced radially away from a skirt portion of the second mass 13, so that the cover plate, mentioned above, of the clutch can be fastened to the free end of the latter skirt portion.

It can be seen in FIG. 1 that the skirt portion 30 comes very close to the casing of the clutch, which enables the available space to be occupied while increasing the inertia of the damped flywheel because of the skirt portion 30, and also because of the second annular member 21 which is also secured by welding to the skirt portion 30.

Radial lugs 32, 34 are attached to this cylindrical skirt portion and are bent back inwardly, generally at right angles to the axis X—X, with the lugs of the two groups lying in two parallel planes which are offset axially from each other. Thus the radial plate is provided with a first group of four radial lugs 32, by means of which it is fixed to the said first annular member, by welds between each of these lugs and one of the radial arms 26. In a modified version, this fastening may be obtained by riveting.

In addition, the said third annular member has a second group of four radial lugs 34, which lie in another plane and which carry articulating means for the above mentioned resilient damping means.

Thus, as can be seen in FIGS. 1 and 3, the radial lugs 34 are provided with holes 36 which are aligned with further holes 38 in the external crown portion 25 of the said first annular member 20, and axially orientated spindles 40 are mounted in these holes, with each spindle articulating an element 14a of the resilient means 14 mentioned above, which are interposed generally radially between the two masses in this example. In the present case, the resilient damping means 14 consist of four cassettes 44 which enclose springs 46. Each cassette includes a bearing 48 which is engaged on the corresponding spindle 40 of the said first mass. The cassette 44, which is relatively flat in the axial direction, encloses two springs 48 and a central damper plate 49 which is formed with apertures, in this example in the form of windows, in which the said springs can be mounted.

The walls of the cassette constitute two parallel guide members for the springs, and they are formed with windows 50 having longitudinal edges which are bent outwardly. The damper plate is fixed to a bearing 52 which is mounted in the region of its radially innermost end, and this bearing surrounds a trunnion 54 which is mounted within the thickness of the said second mass 13 at the inner periphery of the latter. Thus the lugs 32 serve as fastening lugs, while the lugs 34 are configured for mounting the resilient damping means thereon.

The springs 46 are thus urged into compression by the two guide members and the damper plate, constituting draw members mounted in head-to-toe relationship, the guide members being articulated to the outer periphery of the first mass 12, over a large circumference by virtue of the third annular member 22, being also articulated to the inner periphery of the second mass 13.

Figure 2:
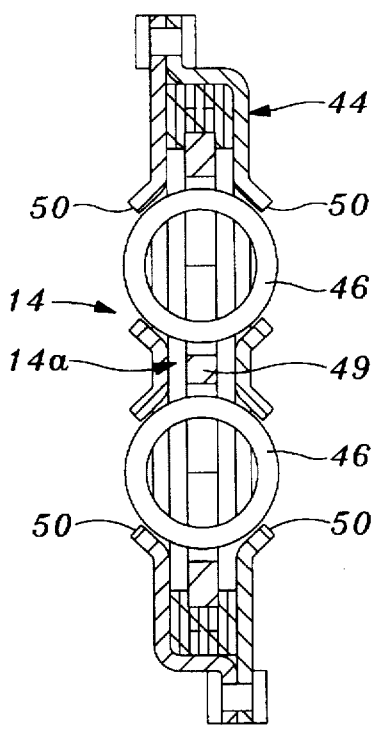
FIG. 2 is a detail view of part of the resilient means.

More precisely, the guide members are joined together laterally, in this example by riveting as can be seen in FIG. 2, so as to constitute the element 14a fixed to the bearing 48, which extends between the two guide members and which is fixed to these latter at each of its ends, for example by welding.

In the rest position, the bearings 48 and 52 are aligned with each other generally radially. In operation, the cassettes deflect in inclination, so as to compress the springs 46.

By virtue of the invention, the length of the cassettes 44 and the springs 46 can be made large, due to the fact that the spindles 40 can be fitted at the outer periphery of the first mass 12 because of the configuration of the annular third member 22.

A good compromise is thus obtained, this compromise enabling the radial size of the damped flywheel to be reduced while providing resilient damping means which are fitted over a large circumference.

It is of course possible to design a first mass having components of press-formed sheet metal which are welded together, with a different configuration which enables more conventional resilient means to be contained in them, that is to say circumferentially acting resilient means. Friction means may be arranged between the mutually facing parts of the said first and second masses.

More precisely, the lugs 34 may be recessed locally, as may be the first annular member 20, for engagement of the circumferential ends of circumferentially acting coil springs actuated by a damper plate in the manner described, for example, in the document EP-A-0 427 083 (FIG. 1), the said damper plate being in that case fixed to the second mass.

The lugs 34 are thus in general terms configured for mounting the resilient damping means.

All this is made possible because of the circumferential offset between the lugs 32 and 34.

Each cassette 44 can of course contain only one spring, in the manner described for example in the document WO-A-94/27062, with the said spring being adapted to be compressed between a piston which is articulated at its inner periphery to the second mass, and a cylinder which is articulated at its outer periphery to the first mass.

It will be noted that the first member 20 has a serpentine profile, such that the axial thickness of the damped flywheel is greater at its outer periphery than at its inner periphery.

Similarly, it will be noted that the lugs 34 of the second group are adjacent to the second mass 13, and more particularly to the transverse face of the latter which faces towards the transverse portion of the first member 20.

It will be noted that the lugs 32 are joined to the skirt portion 30 through rounded zones. The same is true for the lugs 34.

In general terms it will be noted that the hollow of the third member 22 is much deeper than that of the first member 20.

The member 22 encloses the resilient damping means 14, and its skirt portion 30 may be extended axially in accordance with particular applications.

The first member may of course be without any aperture 28, in the case where there is room axially to permit this.

I claim:

1. A damped flywheel, comprising; two coaxial masses mounted for movement of one with respect to the other against the action of resilient damping means (14), in which one of the masses, referred to as a first mass (12), is adapted to be fixed to a driving shaft (16) and consists of a plurality of annular members (20, 21, 22) which are fixed to each other coaxially, and in which one of said annular members, referred to as the first annular member (20), comprises a central portion (100), orientated transversely and fixed to a hub (17) which carries a bearing (18) for rotation of the other mass, referred to as the second mass (13), which constitutes the reaction plate of a friction clutch, wherein another one of said annular members, referred to as a third annular member (22), comprises an annular radial plate (101) having at its outer periphery a cylindrical skirt portion (30) which extends axially and at least partly surrounds the second mass (13), and wherein said radial plate includes a first group of radial lugs (32) by means of which it is fixed to said first annular member (20), together with a second group of radial lugs (34) which are configured for mounting the resilient damping means (14), the lugs (34) of the second group being offset axially with respect to the first group, so that the cylindrical skirt portion (30) encloses the resilient damping means.

2. A damped flywheel according to claim 1, wherein said annular members (20, 21, 22) are welded together.

3. A damped flywheel according to claim 1, wherein said first annular member (20) includes a peripheral crown portion (25) which is joined through radial arms (26) to a central portion (100) which includes the hub (17) integrally therewith.

4. A damped flywheel according to claim 3, wherein said hub (17) is machined for carrying said bearing (18) which constitutes the said bearing.

5. A damped flywheel according to claim 1, wherein the second annular member (21) comprises a ring defining an axial spacer and fixed to the periphery of the said first annular member (20).

6. A damped flywheel according to claim 5, wherein a toothed crown, referred to as a starter crown (130), which is arranged to be driven by a starter, is welded to the outer periphery of the first annular member (20) on a peripheral crown portion (25) of the first annular member (20), and in that the second annular member (21) is welded to the periphery of the first annular member (20) on the other side of the starter crown (130).

7. A damped flywheel according to claim 1, wherein the second group of radial lugs (34) carries means for articulating the resilient damping means.

8. A damped flywheel according to claim 7, wherein the radial lugs (34) of the second group of radial lugs (34) are provided with holes (36) in alignment with holes in the first annular member (20), and the axially orientated spindles are mounted in the said holes.

9. A damped flywheel according to claim 8, wherein the resilient damping means (14) comprise cassettes (44) enclosing springs (46), and in that each cassette (44) includes a second bearing (48) engaged on the corresponding spindle (40) of the first mass.

10. A damped flywheel according to claim 9, wherein the first annular member (20) has apertures (28) defined between the radial arms (26), for accommodating the cassettes (44) therein.

* * * * *